S. J. KEIM,

Assignor of one-half Interest to W. YOUNGER.

Car-Coupling.

No. 8,848. Reissued Aug. 12, 1879.

Witnesses;
Fred G. Dieterich
J. R. Littell,

Inventor;
Simon J. Keim,
by C. A. Snow & Co.
Att'ys.

THE NORRIS PETERS CO., PHOTO-LITHO., WASHINGTON, D. C.

UNITED STATES PATENT OFFICE.

SIMON J. KEIM, OF CATASAUQUA, PENNSYLVANIA, ASSIGNOR OF ONE-HALF INTEREST TO WILLIAM YOUNGER.

IMPROVEMENT IN CAR-COUPLINGS.

Specification forming part of Letters Patent No. 200,311, dated February 12, 1878; Reissue No. 8,848. dated August 12, 1879; application filed July 17, 1879.

*To all whom it may concern:*

Be it known that I, SIMON J. KEIM, of Catasauqua, in the county of Lehigh and State of Pennsylvania, have invented certain new and useful Improvements in Car-Couplings; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
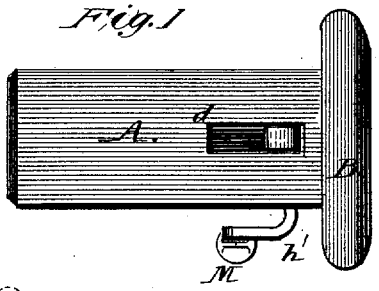
Figure 2:
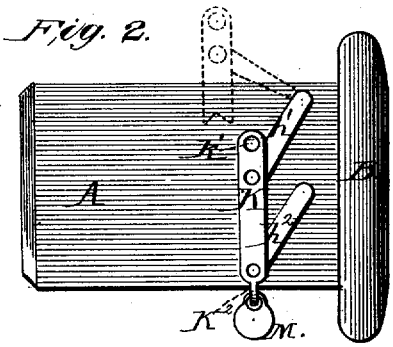
Figure 4:
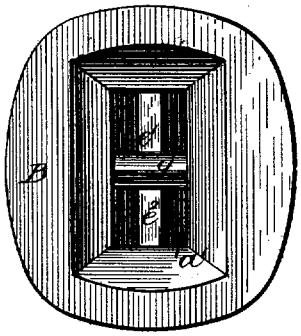
Figure 3:
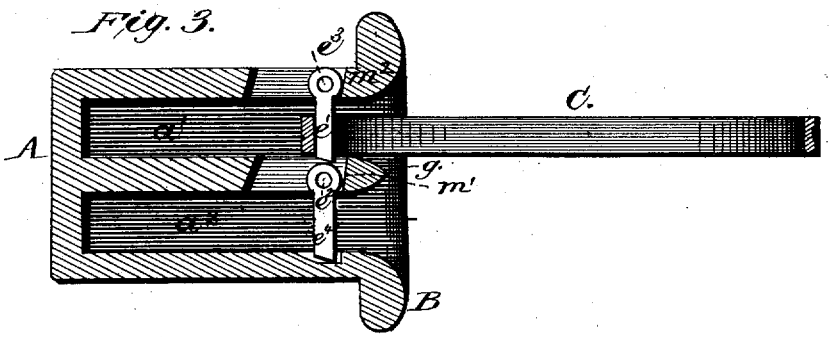

Figure 1 is a plan view. Fig. 2 is a side elevation. Fig. 3 is a longitudinal section: and Fig. 4 is a front end view.

Corresponding parts in the several figures are denoted by like letters of reference.

The object of my invention is to make the railway-cars self-coupling, so that by simply pushing the cars in contact they will become securely fastened without any assistance from the brakeman.

In the drawings, A is the draw-head; B, the buffer; C, the draw-bar or link. The draw-head is made double, having an upper recess, $a^1$, and a lower recess, $a^2$; or there may be several recesses, so that in the event of two cars coming together of different heights there will be no difficulty in coupling them.

A falling bolt or tongue, $e^1$, is secured upon the shaft $e^3$, which passes through the draw-head above the recess $a^1$, and a similar bolt, $e^2$, is secured upon the shaft $e^4$, which passes through the middle web of the draw-head. To the end of each of these shafts is secured a lever-arm, $h^1$ $h^2$. The ends of these arms are connected by a link, K, provided at its lower end with a hook, $K^2$, upon which a weight, M, may be adjusted; or the link itself may be heavy enough to act as a weight. An eye, $k'$, is formed at the top of the connecting link or rod K, into which a chain, rod, or cord may be hooked, so as to enable the device to be operated from the platform or the top of the car.

The bolts $e^1$ $e^2$ are held vertically in the position shown by the weighted levers $h^1$ $h^2$, which, it will be noticed, are set upon the shaft at a slight inclination from the vertical line, so as to absolutely prevent the bolts from swinging back. As soon as the cars are forced together for coupling, the link C forces the bolt which it strikes into its recess, and as soon as it has passed the bolt falls, and the pull of the link brings the toe of it in contact with a stop, $m^1$ or $m^2$, formed on the lower sides of the respective recesses.

The operation of the upper and lower bolts, $e^1$ $e^2$, is the same, and the movement of one is communicated by the link K to the other. When either bolt is forced into its recess the levers $h^1$ $h^2$ take the position shown in dotted lines, Fig. 2.

The buffer B is made with two funnel-shaped mouths, corresponding with the recesses $a^1$ $a^2$, and the central web is pointed at $g$, so as to facilitate the entrance of the link into one or the other of the recesses.

I claim—

1. The combination, in a draw-head, of a series of bolts secured on shafts, one above the other, levers at the ends of said shafts, and a link uniting said levers, as set forth.

2. The combination, in a draw-head, of a series of bolts secured on shafts, one above the other, with the inclined levers at the ends of said shafts, and a weighted link uniting said levers, as set forth.

3. The combination, in a draw-head, of two or more recesses, a series of bolts secured on shafts in said recesses, one above the other, stops formed in said recesses to arrest the forward motion of the toes of the bolts, levers at the ends of the shafts, and a weighted link connecting said levers, as set forth.

In testimony that I claim the foregoing I have hereunto set my hand this 14th day of July, 1879.

SIMON J. KEIM.

Witnesses:

R. CLAY HAMERSLY,
LEWIS P. ANDREWS.